United States Patent
Wilcox et al.

(10) Patent No.: US 10,102,157 B2
(45) Date of Patent: *Oct. 16, 2018

(54) METHOD AND APPARATUS FOR REDUCING POWER CONSUMPTION IN A MEMORY BUS INTERFACE BY SELECTIVELY DISABLING AND ENABLING SENSE AMPLIFIERS

(75) Inventors: Jeffrey R. Wilcox, Hudson, OH (US); Noam Yosef, Haifa (IL)

(73) Assignee: Intel Corporation, Santa Clara, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/447,583

(22) Filed: Apr. 16, 2012

(65) Prior Publication Data

US 2013/0103867 A1 Apr. 25, 2013

Related U.S. Application Data

(63) Continuation of application No. 11/354,304, filed on Feb. 14, 2006, now Pat. No. 8,176,240, which is a continuation of application No. 10/038,960, filed on Jan. 2, 2002, now Pat. No. 7,000,065.

(51) Int. Cl.
*G06F 13/16* (2006.01)
*G06F 1/32* (2006.01)

(52) U.S. Cl.
CPC ............ *G06F 13/16* (2013.01); *G06F 1/3225* (2013.01); *G06F 1/3253* (2013.01); *G06F 13/1668* (2013.01); *Y02D 10/151* (2018.01)

(58) Field of Classification Search
CPC .... G06F 13/16; G06F 13/1668; G06F 1/3225; G06F 1/3253; Y02D 10/151
USPC .......................................... 711/154; 713/320
See application file for complete search history.

(56) References Cited

U.S. PATENT DOCUMENTS

| | | | | |
|---|---|---|---|---|
| 5,559,990 A | * | 9/1996 | Cheng et al. | 711/157 |
| 6,058,059 A | * | 5/2000 | Huang et al. | 365/207 |
| 2006/0069458 A1 | * | 3/2006 | Lee et al. | 700/94 |

* cited by examiner

*Primary Examiner* — Larry T Mackall
(74) *Attorney, Agent, or Firm* — Trop, Pruner & Hu, P.C.

(57) ABSTRACT

A technique includes amplifying data signals from a memory bus interface. The amplified data signals are sampled, and the amplifier is selectively disabled in response to the absence of a predetermined operation occurring over the memory bus. In some embodiments of the invention, the amplification may be selectively enabled in response to the beginning of the predetermined operation over the memory bus.

22 Claims, 5 Drawing Sheets

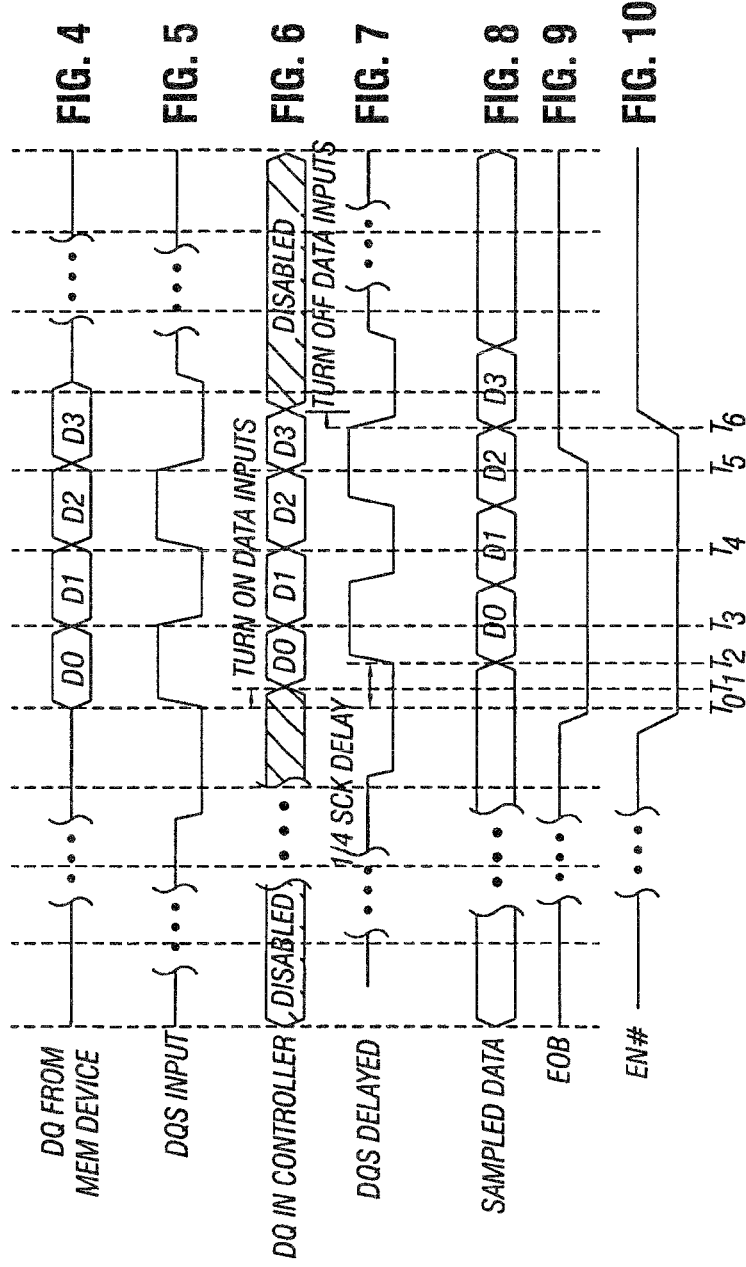

METHOD AND APPARATUS FOR REDUCING POWER CONSUMPTION IN A MEMORY BUS INTERFACE BY SELECTIVELY DISABLING AND ENABLING SENSE AMPLIFIERS

This application is a continuation of U.S. patent application Ser. No. 11/354,304, entitled "METHOD AND APPARATUS FOR REDUCING POWER CONSUMPTION IN A MEMORY BUS INTERFACE BY SELECTIVELY DISABLING AND ENABLING SENSE AMPLIFIERS," filed on Feb. 14, 2006, which issued on May 8, 2012, as U.S. Pat No. 8,176,240 and is a continuation of U.S. patent application Ser. No. 10/038,960, entitled, "METHOD AND APPARATUS FOR REDUCING POWER CONSUMPTION IN A MEMORY BUS INTERFACE BY SELECTIVELY DISABLING AND ENABLING SENSE AMPLIFIERS," which issued on Feb. 14, 2006, as U.S. Pat. No. 7,000,065.

BACKGROUND

The invention generally relates to power reduction in a memory bus interface.

Computer systems use memory devices to store data that is associated with various operations of the system. Collectively, these devices may form the system memory for the computer system. To store data in and retrieve data from the system memory, the computer system typically includes a memory controller that is coupled to the system memory via a memory bus. The signals that propagate over the memory bus depend on the type of memory devices that form the system memory.

For example, one type of memory device is a synchronous dynamic random access memory (SDRAM), a device in which data signals are communicated to and from the SDRAM device over the memory bus in synchronization with positively sloped, or positive going, edges (for example) of a clock signal. This basic type of SDRAM is known as a single data rate (SDR) SDRAM, as the data is clocked once every cycle of the clock signal. In contrast to the single data rate SDRAM, in the operation of a double data rate (DDR) SDRAM, data is clocked both on the positive going and negative going edges of a clock signal (called a data strobe signal), thereby giving rise to the phrase "double data rate."

The data strobe signal, called the "DQS data strobe signal," is furnished either by the system memory or the memory controller, depending on whether a read or write operation is occurring over the memory bus. A SDR SDRAM device does not use the DQS data strobe signal. In a write operation with a DDR SDRAM device, the memory controller furnishes bits of data to the memory bus by controlling the logic levels of data bit lines (called the "DQ data bit lines") of the memory bus. In the write operation, the memory controller furnishes the DQS data strobe signal such that each edge of the DQS data strobe signal is synchronized to a time at which a particular set of data bits (furnished by the memory controller via the DQ data bit lines) is valid on the memory bus. In this manner, the memory controller may offset the phase of the DQS data strobe signal relative to the data bit signals so that the edges of the DQS data strobe signal occur when the particular set of data bits are valid. For example, the DQS signal may be ninety degrees out of phase with the signals present on the DQ data bit lines. Thus, for example, the memory controller furnishes a first set of bits to the memory bus. When these bits are valid, the DQS data strobe signal has a positive going edge. The memory controller furnishes the next set of bits to the memory bus. When these bits are valid, the DQS data strobe signal has a negative going edge, etc.

For a read operation, the above-described role is reversed between the DDR SDRAM device and the memory controller. In this manner, for a read operation, the DDR SDRAM device furnishes both the DQS data strobe and controls the signals that appear on the DQ data bit lines.

When neither a write nor a read operation is occurring over the memory bus, DQ data bit lines as well as the DQS data strobe lines remain at a termination level, a level that may be, for example, between the logic zero and logic one voltage levels. Thus, a potential difficulty with this arrangement is that an input sense amplifier of the memory controller (for example), which receives and amplifies the signal from one of the DQ data bit lines, may use a reference voltage near the termination level. It is this reference voltage that the sense amplifier uses to distinguish a logic one voltage (i.e., a voltage greater than the reference voltage) from a logic zero signal (i.e., a voltage less than the reference voltage). Thus, noise on a particular DQ data signal line may inadvertently appear as a logic one or logic zero voltage to the associated sense amplifier when neither a write nor a read operation is actually occurring over the memory bus. This event may cause inadvertent operation of the sense amplifier and thus, excess power may be dissipated by the amplifier and possibly other circuitry of the memory controller due to this operation.

Thus, there is a continuing need for an arrangement and/or technique to address one or more of the problems that are stated above.

BRIEF DESCRIPTION OF THE DRAWING

FIGS. 4, 5, 6, 7, 8, 9 and 10 are waveforms depicting signals of the computer system according to an embodiment of the invention.

DETAILED DESCRIPTION

Figure 1:
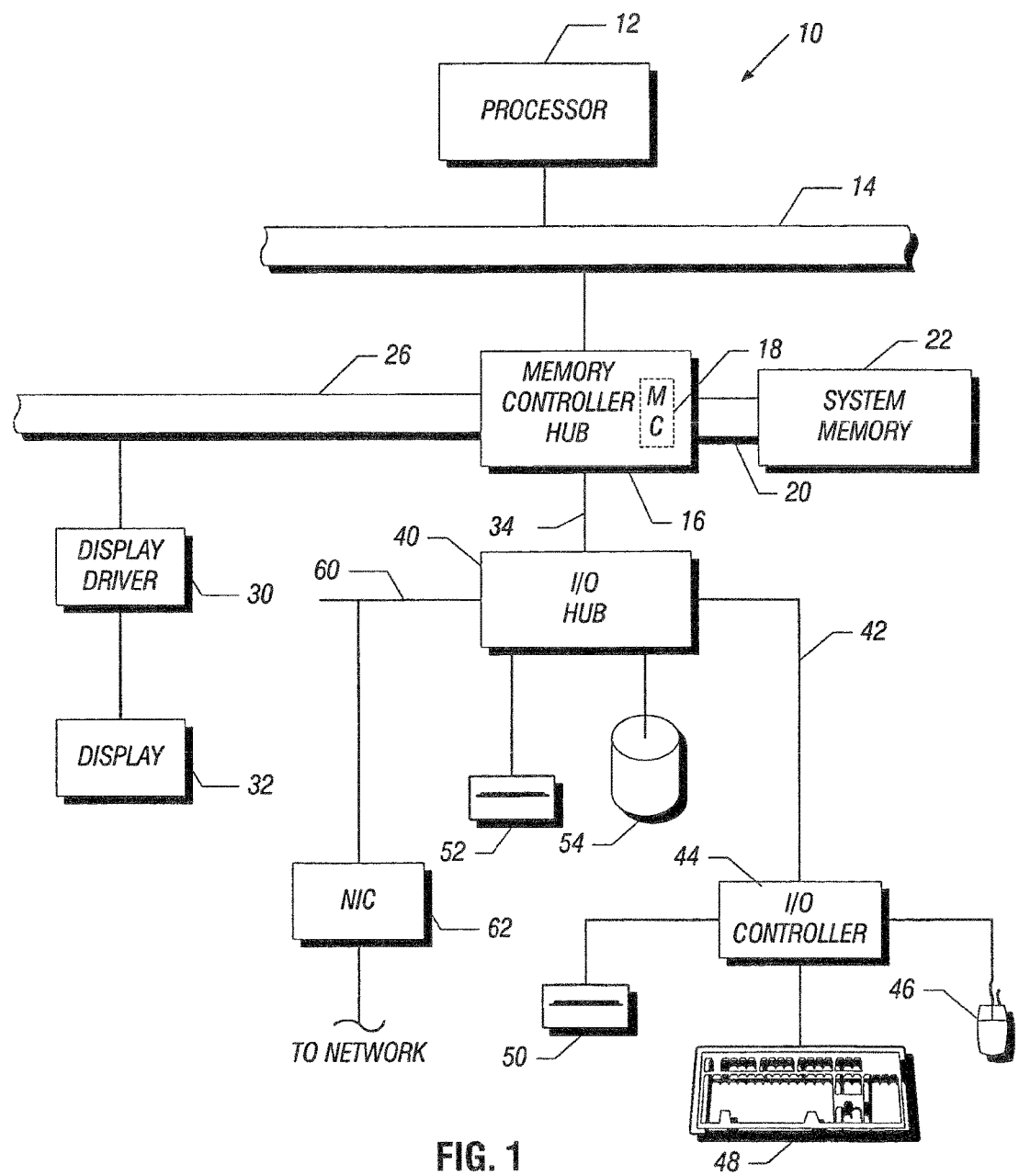
FIG. 1 is a schematic diagram of a computer system according to an embodiment of the invention.

Referring to FIG. 1, an embodiment 10 of a computer system in accordance with the invention includes a system memory 22 for storing various data associated with the operation of the computer system 10. The system memory 22 is formed from a collection of semiconductor memory devices. As an example, the system memory 22 may include double data rate (DDR) synchronous dynamic random access memory (SDRAM) devices.

The devices of the system memory 22 communicate with a north bridge, or memory controller hub 16, via a memory bus 20. In this manner, the memory bus 20 includes various address, control and data signal lines that are associated with communicating bits of data between the memory controller hub 16 and the system memory 22. The memory controller hub 16, in turn, serves as an interface between the rest of the computer system 10 and the system memory 22, and as this interface, furnishes signals to the memory bus 20 to control the reading and writing of data to and from the system memory 22. To accomplish this, the memory controller hub 16 includes a memory controller 18 that forms an interface for the memory controller hub 16 for communications with the system memory 22.

For purposes of reducing the power that is otherwise consumed by the memory controller 18 during times when no read operations are occurring between the memory controller 18 and the system memory 22, the memory controller 18 disables its input data sense amplifiers (not shown in FIG. 1) during these times. These sense amplifiers detect data on the data lines (called "DQ data bit lines") of the memory bus 20 during a read operation and provide signals (indicative of this data) that are sampled by a read buffer (not shown in FIG. 1) of the memory controller 18.

When not being used during a read or write operation, the voltage of each DQ data bit line is set to a termination level, a level between the logic one and logic zero levels. However, each input sense amplifier of the memory controller may use a reference voltage near the termination level. It is this reference voltage that each sense amplifier uses to distinguish a logic one voltage (i.e., a voltage greater than the reference voltage) from a logic zero signal (i.e., a voltage less than the reference voltage). Thus, noise on a particular DQ data signal line may inadvertently appear as a logic one or logic zero voltage to the associated sense amplifier when neither a write nor a read operation is actually occurring over the memory bus. This event may cause inadvertent operation of the sense amplifier, if not for the disablement of these sense amplifier, as described below.

As a more specific example, in some embodiments of the invention, the logic one voltage may be approximately 2.5 volts; the logic zero voltage may be approximately zero volts; and the termination and reference voltages may be approximately 1.25 volts. Other voltage levels may be used in other embodiments of the invention.

By disabling the sense amplifiers of the memory controller when a write or read operation is not occurring over the memory bus 20, the sense amplifiers do not respond to noise that is present either on the DQ data bit lines of the memory bus 20. As a result, the sense amplifiers only respond to the DQ data bit lines during a particular read operation, when their associated DQ data bit lines are driven from the termination level to either a logic one or a logic zero level.

More particularly, FIGS. 4 and 5 illustrate the signals present on a data bit line (FIG. 4) and the DQS data strobe line (FIG. 5) during a burst read operation in which a predetermined number (two, four or eight, for example) of bits of data are received in sequence over each DQ data bit line. The memory controller may be configured to the number of bits that are transferred in each burst. In the example described herein, each DQ data bit line communicates four bits of data in sequence in a burst read operation.

In this example, the first bit of data (bit D0) that is furnished by the system memory 22 occurs at time $T_0$, a time at which the system memory 22 also asserts the DQS data strobe, as depicted in FIG. 5. At time $T_2$, the system memory 22 begins furnishing a signal to the DQ bit line indicative of a D1 bit of data and synchronously deasserts the DQS data strobe signal. This process continues for the remaining two bits. For example, at time $T_4$, the system memory 22 asserts the DQS data strobe signal and begins furnishing a signal to the DQ data bit signal line indicative of the D2 bit of data. Thus, as can be seen from FIGS. 4 and 5 the generation of the D0, D1, D2 and D3 data bits occurs in synchronization with alternating edges of the DQS data strobe signal.

For purposes of sampling each data bit from the DQ data bit line, the memory controller 18 shifts, or delays the DQS data strobe signal to align each edge of the DQS data strobe signal with the data eyes of the associated data signal. The term "data eye" refers to the portion of the data signal in which the data signal indicates a particular bit of data. Thus, the "data eye" would not include the portions of the data signal in which the data signal transitions between logical states.

The net effect of the alignment of the DQS data strobe signal with the data eyes of the data signals is that the memory controller 18 delays the DQS data strobe signal to produce an internal, delayed DQS data strobe signal that is depicted, as an example, in FIG. 7. Thus, as can be seen from FIG. 7, the first positive going edge of the delayed DQS data strobe signal (that appears at time $T_2$) is aligned approximately in the center of the data eye of the portion of the DQ signal that indicates the D0 data bit, the subsequent negative going edge of the delayed DQS data strobe signal is aligned in the center of the data eye that indicates the D1 data bit, etc. Ideally, the delay centers the strobe's edges in the data eyes, but the delay may deviate from this ideal relationship due to system and memory controller timing effects. Nevertheless, there is still a delay between the DQS data strobe signal and the delayed DQS data strobe signal.

The memory controller 18 enables its input read sense amplifiers in response to the beginning of a read operation. The memory controller 18, in response to the end of the read operation, disables its sense amplifiers, thereby preventing unnecessary consumption of power.

Thus, for the above-described read operation, the memory controller 18 may behave in the following fashion. Before time $T_0$ in this example, no read operation is occurring, therefore, the memory controller 18 disables its sense amplifiers. However, at time $T_0$ the read operation begins, as the data signals (such as the DQ signal depicted in FIG. 4) and the DQS data strobe signal (FIG. 5) appear at the memory controller on the DQ and DQS lines. These signals are generated by the system memory 20. Slightly before or at time $T_0$, logic of the memory controller 18 recognizes the beginning of the read operation and deasserts an end of byte signal called EOB. (FIG. 9). As described below, the memory controller 18, in some embodiments of the invention, asserts an inverted sense amplifier enable signal called EN# (FIG. 10) in response to the deassertion of the EOB signal to enable the input sense amplifiers. The enablement of the sense amplifiers occurs before the leading positive going edge of the delayed DQS data strobe signal, as depicted in FIGS. 6 and 7. Thus, when read buffers of the memory controller 18 respond to the edges of the delayed DQS data strobe signal to begin sampling the data bits, the sense amplifiers have already been enabled, thereby permitting the sense amplifiers to furnish an indication of the signal on the associated data bit line to the data buffers.

FIG. 8 depicts the sampled data inside the read buffers of the memory controller 18. In this manner, at time $T_2$, in response to the positive going edge of the delayed DQS data strobe signal, the read buffer samples the D0 bit, and thus, the sampled D0 bit appears in the read buffer beginning at time $T_2$. The D2, D3 and D4 bits are sampled in sequence in a similar manner.

Figure 2:
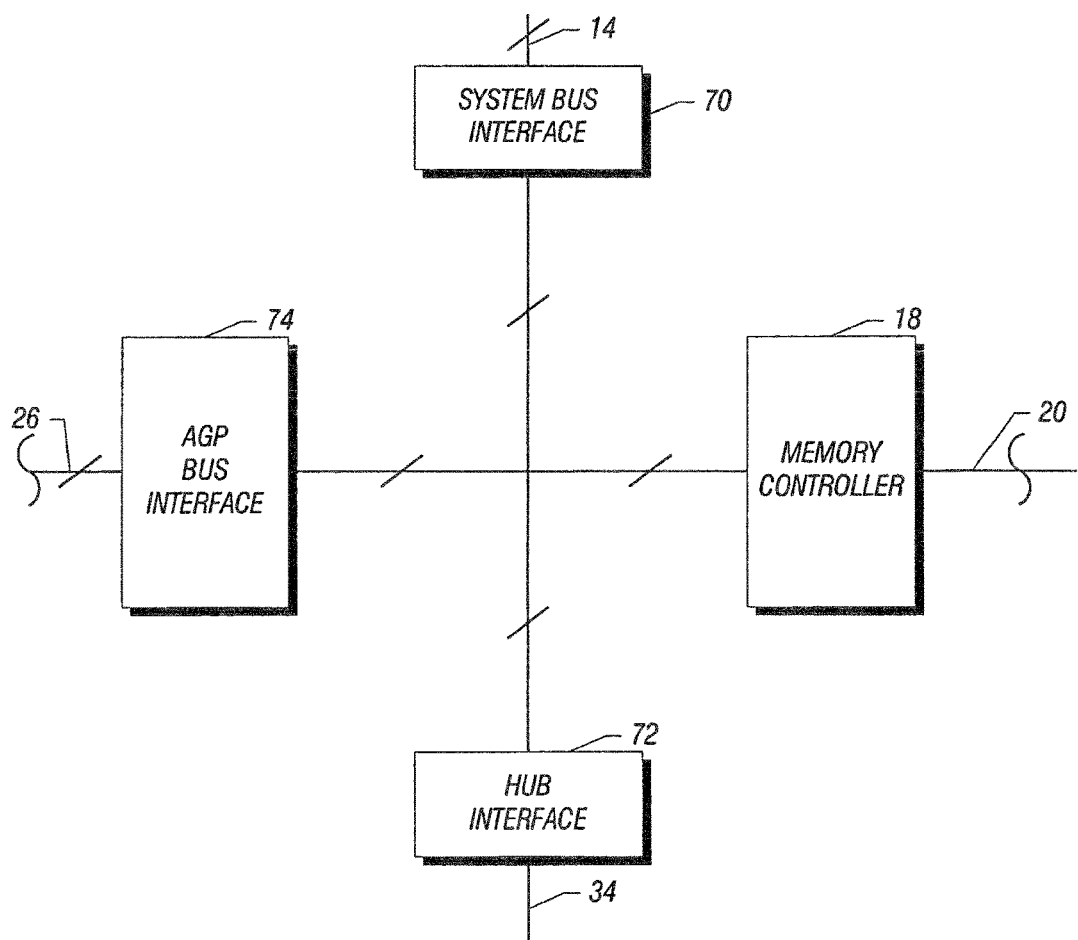
FIG. 2 is a schematic diagram of a memory controller hub according to an embodiment of the invention.

Referring to FIG. 2, in some embodiments of the invention, the memory controller hub 16 may include the memory controller 18 to communicate with the memory bus 20; a system bus interface 70 to communicate with a system bus 14 of the computer system 10; an Accelerated Graphics Port (AGP) bus interface 74 to communicate with an AGP bus 26

(FIG. 1) of the computer system; and a hub interface 72 to communicate with a south bridge, or I/O hub 40, of the computer system. The AGP is described in detail in the Accelerated Graphics Port Interface Specification, Revision 1.0, published on Jul. 31, 1996, by Intel Corporation of Santa Clara, Calif. The memory controller 18, system bus interface 70, AGP bus interface 74 and hub interface 72 are all coupled together to communicate data to various parts of the computer system 10.

Figure 3:
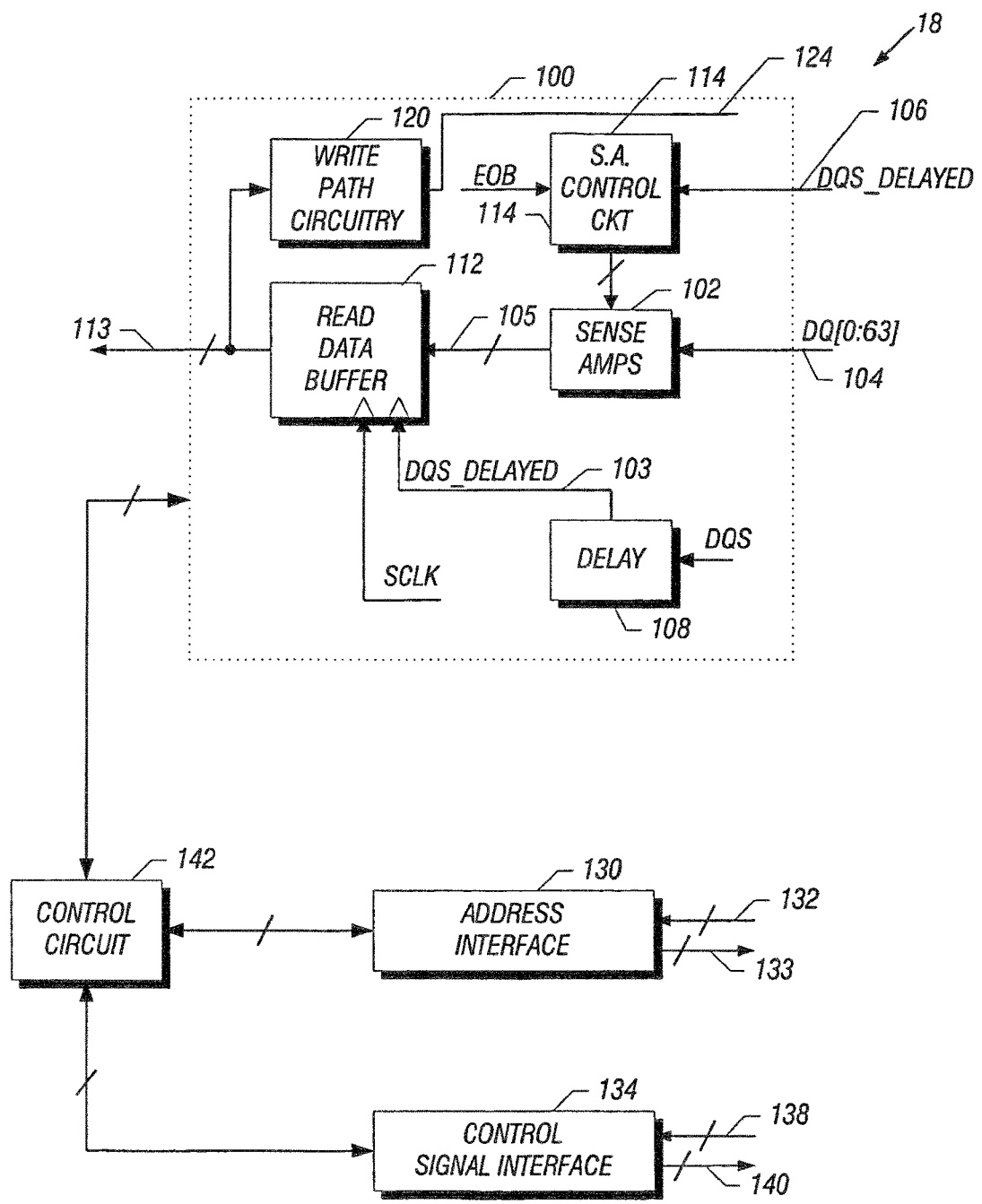
FIG. 3 is a schematic diagram of a memory controller according to an embodiment of the invention.

Referring to FIG. 3, in some embodiments of the invention, the memory controller 18 includes a data interface 100, an address interface 130 and a control signal interface 134. The address interface 130 includes communication lines 133 for driving address signals onto the memory bus 20 to initiate a particular read or write operation. The control signal interface 134 includes signal communication lines 140 to drive the appropriate drive control signals on the memory bus 20 to initiate a particular read or write operation. The address interface 130, control signal interface 134 and data interface 100 are all coupled to a control circuit 142 that controls and coordinates the general operations of the memory controller 18.

The data interface 100 includes write path circuitry 120 for purposes of writing data to the system memory 22. In this manner, the write path circuitry 120 is coupled to the other circuitry of the memory controller hub 16 via communication lines 113 and is in communication with the memory bus 20 via communication lines 124.

The data interface 100 also includes a circuitry associated with the read path of the data interface 100. In this manner, the data interface 100 includes sense amplifiers 102 that are coupled to receive data bit line signals (called DQ[0:63], which represents sixty-four DQ data bit lines as an example) from respective data bit lines 104 of the memory bus 20.

The enablement/disablement of the sense amplifiers 102 is controlled by a sense amplifier control circuit 114. In this manner, as further described below, in response to the beginning of a read operation, the sense amplifier control circuit 114 enables the sense amplifiers 102, and in response to the end of a particular read operation (and no subsequent read operation), the sense amplifier control circuit 114 disables the sense amplifiers 102.

To detect the beginning and ending of a particular read operation, in some embodiments of the invention, the sense amplifier control circuit 114 receives the EOB signal from the control circuit 142. The EOB signal is asserted (driven high, for example) to indicate the end of a read operation, such as the end of a read burst operation, for example; and the EOB signal is deasserted (driven low, for example) to indicate the beginning of the read operation. In response to the assertion of the EOB signal, the sense amplifier control circuit 114 disables the sense amplifiers 102.

Among the other circuitry of the data interface 100, the data interface 100, in some embodiments of the invention, includes a delay circuit 108 that is coupled to the DQS data strobe line 106 to receive the DQS data strobe signal. The delay circuit 108 delays the DQS data strobe signal to produce a delayed data strobe signal (such as the signal depicted in FIG. 8) that appears on a clock signal line 103 that clocks operations of a data buffer 112, as further described below. In some embodiments of the invention, the delay circuit 108 delays the DQS data strobe by one quarter period of a system clock signal (called SCLK). The SCLK system clock signal, in turn, may be used, for example, on the output side of the read data buffer 112 to read the sample data from the read data buffer 112. Furthermore, the frequency of the SCLK signal may be approximately the same as the frequency of the DQS strobe signal when driven.

The read data buffer 112 includes input lines 105 that are coupled to the output terminals of the sense amplifiers 102. In response to a particular edge (a positive going edge or a negative going edge) of the delayed DQS data strobe signal, the read data buffer 112 samples the signals present on the output terminals of the sense amplifiers 102, latches the samples and stores them for retrieval from the read data buffer 112. For purposes of illustration, it may be assumed that the stored data may be retrieved from the read data buffer 112 in synchronization with the SCLK system clock signal. However, other variations may be used.

Figure 11:
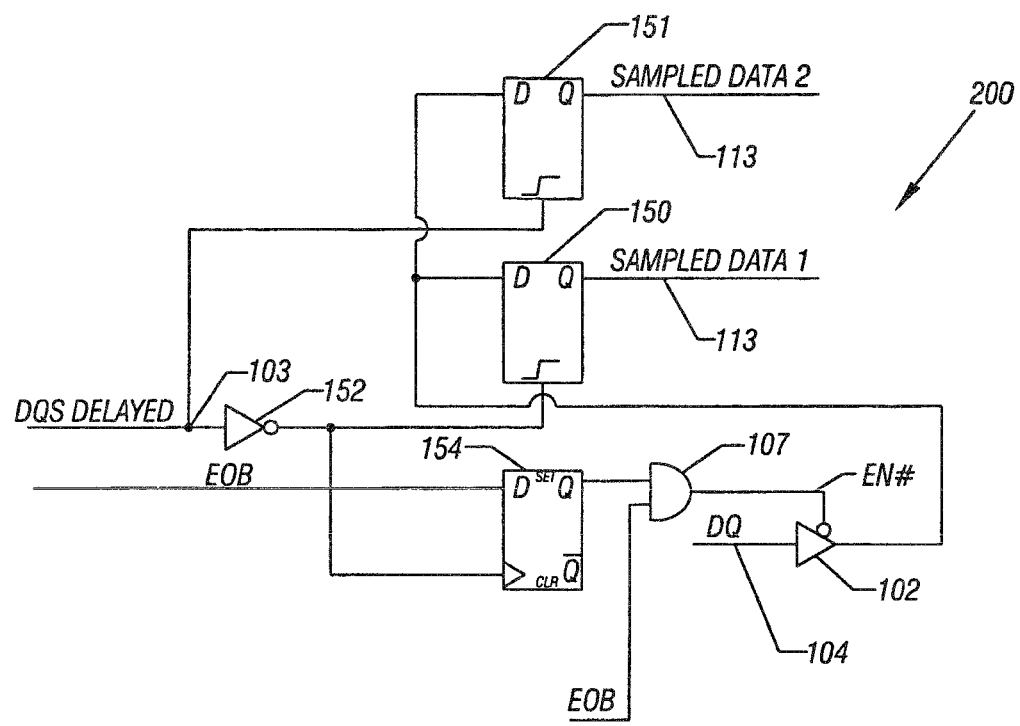
FIG. 11 is a schematic diagram of control circuitry for a sense amplifier according to an embodiment of the invention.

FIG. 11 depicts circuitry 200 associated with each data bit line 104 in accordance with an embodiment of the invention. In the various embodiments of the invention, the circuitry 200 may be replicated for each data bit line 104. In this circuitry 200, the sense amplifier control circuit 114 includes a D-type flip-flop 154 that furnishes (at its non-inverted output terminal) a signal that is used to disable one of the sense amplifiers 102 in response to the end of a particular read operation.

More particularly, near the conclusion of a particular read operation, the flip-flop 154 drives its non-inverted output terminal high. This event, in turn, causes a signal (called EN# and depicted in an example in FIG. 10) that is received by the inverted enable terminal of the sense amplifier 102 to be deasserted (driven high, for example) to disable the sense amplifier 102.

As depicted in FIG. 9, the flip-flop 154 receives the EOB signal at its input signal terminal, and the clock terminal of the flip-flop 154 is connected to the output terminal of an inverter 152 that receives the internal read delay DQS data strobe signal, i.e., the input terminal of the inverter 152 is coupled to the communication line 103. The flip-flop 154 is clocked on the positive going edges of the clock signal present at its clock terminal. Therefore, the flip-flop 154 is clocked on the negative going edges of the delayed DQS signal. The non-inverted output terminal of the flip-flop 154 is coupled to one input terminal of an AND gate 107, and the output terminal of the AND gate 107 furnishes the EN# signal.

The memory controller 18 uses the circuitry 200 in the following manner. In a particular read operation (a burst read operation, for example) before the last negative going edge of the DQS data strobe signal, the control circuit 142 asserts (drives high, for example) the EOB signal. For the example depicted in FIG. 9, the control circuit 142 asserts the EOB signal around time $T_5$. The flip-flop 154 responds to the negative going edge of the delayed DQS data strobe signal by driving high the voltage of its non-inverted output terminal. This causes the AND gate 107 to deassert (drive high, for example) the EN# signal. For the example depicted in FIG. 10, this deassertion of the EN# signal occurs at time $T_6$. Therefore, in response to the last negative going edge of the delayed DQS data strobe signal, the flip-flop 154 disables the sense amplifier 102.

To enable the sense amplifier 102 at the beginning of a read operation, the AND gate 107 receives the EOB signal. Thus, due to this arrangement, in response to the deassertion of the EOB signal, the EN# signal is asserted (driven low, for example). In the example depicted in FIGS. 9 and 10, the EN# is fully asserted and the EOB signal is fully deasserted at or before time $T_0$ before the data bits are valid.

By the time the EOB signal is asserted (driven high, for example) to indicate the end of the read burst, the flip-flop 154 has already asserted its non-inverting output terminal, thereby producing a logic one signal at one of the input terminals of the AND gate 107. Thus, it is the last negative going edge of the delayed DQS strobe signal that produces the additional logic one signal at the other input terminal of the AND gate 107 to cause deassertion of the EN# signal and disablement of the sense amplifier 102.

The circuitry 200 depicted in FIG. 11 also includes latches 150 and 151, circuitry of the read data buffer 112. In this manner, the read data buffer 112 includes the latches 150 and 151 for each data bit line of the memory bus 20. The latch 150 captures its input from the output terminal of the sense amplifier 102 in synchronization with the negative going edge of the delayed DQS data strobe signal, and thus, its latching trigger input terminal is coupled to the input terminal 103 of the buffer 152. The latch 151 captures its input from the output terminal of the sense amplifier 102 in synchronization with the positive going edge of the delayed DQS data strobe signal, and thus, its latching trigger input terminal is coupled to the input terminal 103 of the buffer 152. The non-inverting output terminals of the latches provide signals indicative of captured bits of data to respective communication lines 113.

Figure 12:
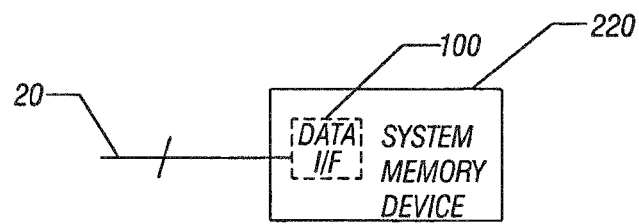
FIG. 12 is a schematic diagram of a memory device according to an embodiment of the invention.

Other embodiments within the scope of the following claims. For example, the circuitry of the memory controller 18 may be used in a similar fashion in a particular memory device of the system memory 22. In this manner, referring to FIG. 12, in some embodiments of the invention, a particular system memory device 220 may include, for example, the data interface 100 described above in connection with the memory controller 18. Thus, for these embodiments, instead of disabling the sense amplifiers of the memory device in response to the absence of a read operation, the interface 100 disables the memory device 220 in the absence of a write operation, i.e., an operation in which data is received from the memory controller 18. Other variations are within the scope of the following claims.

Referring back to FIG. 1, among the other features of the computer system 10, in some embodiments of the invention, the computer system includes a processor 12 (one or more microprocessors, for example) that is coupled to the system bus 14. The processor 12 may, for example, execute instructions to initiate read and write operations with the system memory 22. The computer system 10 may also include a display driver 30 that is coupled to the AGP bus 26 as well as a display 32 that is driven by signals from the display driver in response to communications over the AGP bus 26.

The memory controller hub 16 may communicate over the hub link 34 to the I/O hub 40 that, in turn provides an interface to an I/O expansion bus 42 and a Peripheral Component Interconnect (PCI) bus 60. The PCI Specification is available from The PCI Special Interest Group, Portland, Oreg. 97214. An I/O controller 44 may be coupled to the I/O expansion bus 42 and may receive input from a mouse 46 and a keyboard 48. The I/O controller 44 may also control operations of a floppy disk drive 50. The I/O hub 40 may control operations of a CD-ROM drive 52 as well as control operations of a hard disk drive 54. The PCI bus 60 may be coupled to a network interface card (NIC) that is connected to a network to establish communications between the computer system 10 and the network. Other variations of the computer system 10 are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus, comprising:
a semiconductor memory;
a sense amplifier coupled to read data from the semiconductor memory; and
a circuit to save power when data is not being read from the semiconductor memory, the circuit to:
maintain the sense amplifier enabled for a continuous time interval including a first memory access, wherein the sense amplifier is to sense data during the first memory access and is to sense data during a second memory access; and
selectively disable the sense amplifier after the second access based at least in part on a signal inactivity of a memory bus.

2. The apparatus of claim 1, in which the circuit is to enable the sense amplifier when a read operation is detected upon initiation.

3. The apparatus of claim 1, in which the semiconductor memory includes static dynamic random access memory.

4. The apparatus of claim 1, in which the circuit is to enable the sense amplifier in response to a beginning of a read operation.

5. The apparatus of claim 4, in which the circuit is to disable the sense amplifier in response to the end of the read operation.

6. The apparatus of claim 1, in which the circuit is implemented with a sense amplifier control circuit.

7. The apparatus of claim 1, wherein the signal inactivity comprises a signal state identifying an end of a burst read operation, and the circuit is to disable the sense amplifier based at least in part on detection of the signal state.

8. The apparatus of claim 1, wherein the circuit is adapted to detect pauses in the sequence of accesses to save power when data is not being read from the semiconductor memory.

9. The apparatus of claim 1, further comprising:
a processor to initiate a request to read data from the semiconductor memory.

10. The apparatus of claim 9, further comprising:
a system bus to communicate the request with the memory bus.

11. The apparatus of claim 9, further comprising:
the memory bus.

12. The apparatus of claim 1, further comprising:
a memory controller to communicate the read data.

13. A chip, comprising:
a semiconductor memory; and
a memory controller to control reading data from the semiconductor memory, the memory controller including at least one sense amplifier to read data stored in the semiconductor memory, the memory controller to save power when data is not being read from the semiconductor memory, the memory controller to:
maintain the at least one sense amplifier enabled for a continuous time interval including a first memory access proceeded in time by a second memory access, wherein the sense amplifier is to sense data during the first memory access and is to sense data during the second memory access; and
selectively disable the at least one sense amplifier after the second memory access based at least in part on a signal inactivity of a memory bus.

14. The chip of claim 13, in which the memory controller is to enable the sense amplifier when a read operation is initiated.

15. The chip of claim 13, in which the semiconductor memory includes static dynamic random access memory.

16. The chip of claim 13, in which the memory controller is to enable the sense amplifier in response to a beginning of a read operation.

17. The chip of claim 16, in which the memory controller is to disable the sense amplifier in response to the end of the read operation.

18. The chip of claim 13, in which the memory controller includes a sense amplifier control circuit to disable the sense amplifier.

19. A method comprising:
communicating data with a semiconductor memory using a memory bus,
wherein communicating the data comprises:
sensing data for a plurality of memory accesses during a continuous time interval, wherein the plurality of memory accesses comprises a first memory access and a second memory access that proceeds the first memory access in time, and the sensing comprises:
using the sense amplifier to sense data for a first access of the plurality of accesses, using the sense amplifier to sense data for a second access of the plurality of accesses, and maintaining the sense amplifier enabled during the continuous time interval; and
selectively disabling the sense amplifier after the second access based at least in part on a signal inactivity of the memory bus.

20. The method of claim 19, further comprising enabling the sense amplifier in response to detecting a read operation.

21. The method of claim 19, further comprising enabling the sense amplifier in response to detecting a beginning of a read operation.

22. The method of claim 19, wherein sensing the data comprises sensing data for a plurality of read accesses.

* * * * *